United States Patent Office 2,707,964
Patented May 10, 1955

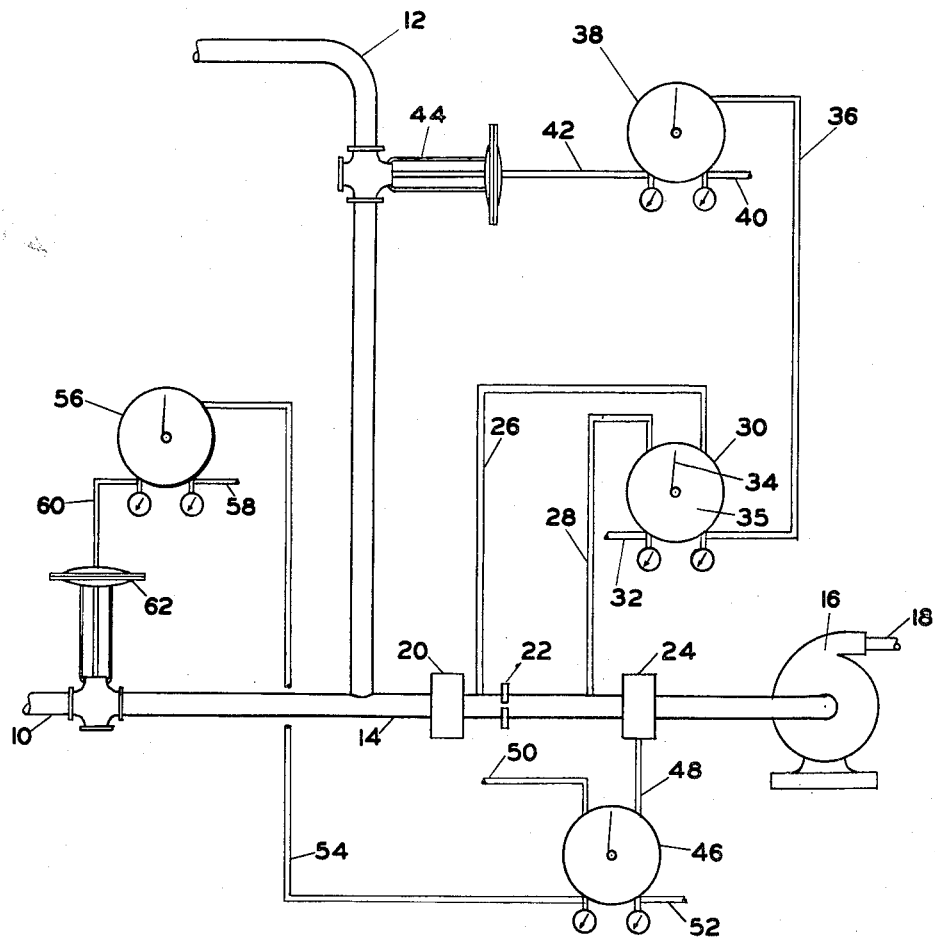

2,707,964

MEASUREMENT AND CONTROL OF THE COMPOSITIONS OF FLOWING STREAMS OF FLUID MIXTURES

Paul S. Monroe, Summit, N. J., assignor, by mesne assignments, to the United States of America as represented by the United States Atomic Energy Commission Application September 12, 1950, Serial No. 184,382

5 Claims. (Cl. 137—4)

This invention relates to the measurement and control of the compositions of flowing streams of fluid mixtures produced by mixing component fluid streams containing materials of somewhat different densities.

In many industries, particularly the chemical process industries, there are numerous cases where component streams of fluids are continuously mixed to form mixed streams of fluid which it is desired to maintain at a particular predetermined composition. In some cases such mixtures are prepared by mixing substantially pure components and no particular problem is encountered since adequate methods are available for measuring and regulating the flows of the component streams independently before they are mixed. In other cases, however, one of the component streams may have a varying and uncontrollable composition, and hence a correspondingly varying flow of the second component stream is required to achieve a mixed stream of constant composition. In this second class of cases the problem of achieving a constant composition of the fluid mixture is considerably more difficult. For convenience in description, the component streams of the second class of cases will be referred to herein as an uncontrollable stream and a controlled stream, respectively.

One example of the second class of cases outlined above is an air-conditioning system of the type wherein a body of air is recirculated and fresh air and water in the form of steam are added at one point in the cycle. The amount of water in the recycled air may vary considerably depending upon how many people or how many moisture-producing objects occupy the space being conditioned. In such a system there is a need for a method and apparatus for automatically regulating the flow of added steam to provide a constant humidity in the air supplied to the space to be conditioned. In the foregoing example the mixture of fresh air, recycled air and associated moisture is the uncontrollable stream and the steam is the controlled stream.

It is an object of the present invention to provide a simple and effective method of continuously measuring the composition of a flowing fluid stream composed of a mixture of components having different densities. It is another object of the invention to provide an improved method of continuously producing, by mixture of two or more fluid streams, at least one of which is uncontrollable, a flowing mixture of fluid components in predetermined desired proportions. It is still another object of the invention to provide apparatus capable of carrying out the method of the invention. Other objects of the invention will be in part obvious and in part pointed out hereafter.

In one of its broader aspects the method of the invention comprises mixing an uncontrollable fluid stream and a controlled fluid stream containing components of somewhat different densities to form a mixed stream, establishing and maintaining a constant volume flow of the mixed stream through a restriction, and measuring the pressure difference across the restriction as a measure of the composition of the mixed stream flowing therethrough. It is well known that the flow through an orifice varies as the square root of the head of fluid flowing therethrough. Hence if a constant flow is established through the orifice and the pressure difference across the orifice is measured in terms of some standard pressure unit such as inches of water or pounds per square inch, the measured pressure difference will vary in accordance with density of the fluid. In the present case density is proportional to composition and therefore the measured differential is an indication of the composition of the mixed stream.

In the case of gaseous fluids the head of flowing fluid may be significantly affected by variations in either temperature or pressure or both. In many cases the variation of temperature does not present any very serious problem since the operation can be carried out at an ambient temperature which is normally constant within close enough limits to permit reasonably accurate measurement. However, it is usually desirable to control in a suitable manner the pressure of the mixed gas stream in order to have the differential pressure across the orifice reflect with sufficient accuracy changes in the composition of the fluid mixture flowing therethrough.

In a somewhat narrower aspect, the present method involves producing a continuously flowing stream which is a mixture, in particular desired proportions, of an uncontrollable component stream and a controlled stream. The two streams are mixed and passed through a restriction at constant volume flow as above described. The differential pressure across the orifice is measured as an indication of the composition of the mixture flowing through the orifice and the flow rate of the controlled stream is automatically adjusted in accordance with the measured differential to maintain the composition of the mixed fluid substantially constant.

The many objects and advantages of the present invention may be best understood and appreciated by reference to the accompanying drawing which illustrates apparatus incorporating a preferred embodiment of the present invention and capable of carrying out the method of the invention. Referring to the drawing, an uncontrollable fluid stream enters the system there shown through branch pipe 10 and is mixed with a controlled stream entering through branch pipe 12. The mixed fluid flows through the pipe 14 to a constant volume pump 16 from which it is discharged through a pipe 18 to a suitable point of use. The pump 16 may be of a conventional positive displacement type and operates to draw a constant volume of the mixed gas through pipe 14.

Between the junction of branch pipes 10 and 12 and pump 16 the mixed gas flowing through pipe 14 passes successively through a surge chamber 20, orifice 22 and a surge chamber 24. In order to measure the differential pressure across the orifice 22, the pipe 14 is connected, at points a short distance upstream and downstream of orifice 22, by the pipes 26 and 28 with the differential measuring instrument 30 which is shown as a pneumatic pressure transmitter of conventional and well-known construction. The transmitter 30 includes a differential pressure-responsive device responsive through pipes 26 to 28 to the pressure across orifice 22. It receives supply air under pressure through pipe 32 and operates to produce a pneumatic pressure that is proportional to the differential pressure across orifice 22 as measured by the differential pressure-responsive component of the transmitter. The transmitter 30 is provided with the usual indicating arm or pen 34 which indicates the measured value of the differential pressure on a suitable chart 35. The chart 35 may, if desired, be calibrated to show directly the composition of the fluid mixture flowing through pipe 14.

The pneumatic output of transmitter 30 is conducted through a pipe 36 to a pneumatic pressure controller 38 of conventional design. The pressure controller 38 receives supply air through a pipe 40 and operates to produce a pneumatic pressure output which is a function of the pneumatic input entering the controller through pipe 36. The output pressure of controller 38 is conducted through pipe 42 to a pneumatically operated regulating valve 44 in the branch pipe 12. Thus the differential pressure across orifice 22 is used as a control variable to vary the flow rate of the controlled steam in pipe 12 and thereby maintain the composition of the fluid mixture within pipe 14 substantially constant. It will be recognized that the controlled composition of the fluid mixture may be adjusted as desired by adjusting the control point, i. e., pressure control setting of the controller 38.

As pointed out above, in cases where the fluid mixture is a gaseous mixture it is desirable that the pressure within pipe 14 also be controlled. In such cases, the surge chamber 24 is connected to a differential-pressure-responsive pneumatic transmitter 46, which may be similar to the transmitter 30, by a pipe 48. The pipe 50 connected to the input side of transmitter 46 may be left open to the atmosphere or connected to a fixed pressure source (not shown). For example, if the gaseous mixture in pipe 14 is for process reasons at a relatively low pressure, the pipe 50 is desirably connected to a source of high vacuum to provide a standard fixed pressure source. The pressure within pipe 14 is then maintained by the apparatus presently to be described at a value which is a predetermined amount higher than this evacuated source of constant pressure. In many cases, however, the pipe 50 can be left open to the atmosphere as above indicated.

The transmitter 46 is supplied with air under pressure through pipe 52 and operates to produce a pneumatic output pressure that is proportional to the difference in pressures existing between pipes 48 and 50. The output of transmitter 46 is conducted by pipe 54 to a pressure controller 56, which may be similar to the controller 38. Supply air passes through pipe 58 to controller 56 which operates to produce a pneumatic output pressure that is a function of the input pressure in pipe 54. The output of controller 56 is conducted through pipe 60 to a pneumatically operated regulating valve 62 in pipe 10. Thus the flow rate of the uncontrollable stream in pipe 10 is automatically adjusted to maintain the pressure in pipe 14 substantially constant.

Tests with a system substantially similar to that illustrated in the drawing have shown that a system of this type is capable of maintaining the composition of a fluid mixture constant within relatively narrow limits. In one series of tests, the apparatus was used to control the composition of a flowing mixture produced by mixing an uncontrollable stream composed of perfluoroheptane ($C_7H_{14}$) in vapor form and nitrogen and a controlled stream of substantially pure nitrogen. The concentration of the components in the "uncontrollable" stream was varied from about 40 mol percent nitrogen to about 70 mol percent nitrogen for a number of different settings of the control point of controller 38 and the composition of the mixed gas downstream of orifice 22 determined by taking samples thereof for independent analysis. It was found that in most cases the mixture was maintained by the apparatus within about 0.5% of the composition for which the controller 38 was set, and the greatest error observed in these tests was only 1.3%. It is thus apparent that the present method and apparatus provides an unusually effective way of measuring and controlling the composition of a flowing stream.

It is, of course, to be understood that the foregoing description is illustrative only and that numerous modifications may be made therein. For example, as indicated above, if it is desired only to measure the composition of the flowing liquid mixture, the controllers 38, 46 and 56 may be omitted and instrument 30 may be a simple differential pressure measuring device. Also, if the nature of the fluid mixture in pipe 14 is such that satisfactory measurements can be made and composition control achieved without pressure regulation, the transmitter 30 and pressure controller 38 may be used and the instruments 46 and 56 omitted. In some cases, the output of pressure transmitter 30 may be connected directly to valve 44 and the output of transmitter 46 connected directly to valve 62. However, in most systems greater stability can be achieved by including the controllers 38 and 56. Other modifications within the scope of the invention will be apparent to those skilled in the art.

I claim:

1. The method of producing a continuously flowing stream of substantially constant predetermined composition composed of a mixture of two or more mutually miscible fluid components having different densities, which comprises, establishing and maintaining a first fluid stream containing at least one of said components and less than the desired proportion of another of said components, continuously adding to and mixing with said first stream a second stream comprising said other component to form a mixed stream, passing a substantially constant flow of said mixed stream through a restriction to produce a pressure drop across said restriction that is a function of the relative proportions of said components in said mixed stream regulating the flow of said first stream to maintain the pressure downstream of said orifice substantially constant, measuring the magnitude of said pressure drop, and regulating the rate of addition of said second stream in accordance with the measured value of said pressure drop to maintain the relative proportions of said components in said mixed stream substantially constant.

2. Apparatus for regulating the composition of a fluid mixture flowing in a mixed fluid conduit connected to and fed by a pair of branch conduits carrying fluid components having substantially different densities comprising, in combination with said mixed fluid conduit and branch conduits, first and second regulating means in the first and second branch conduits, respectively, for regulating flow of fluid through each of said conduits, a restriction in said mixed fluid conduit, means associated with said mixed fluid conduit for establishing and maintaining a constant flow of fluid therethrough, first control means responsive to the pressure downstream of said restriction and operatively connected to said first regulating means, and second control means responsive to the pressure across said restriction and operatively connected to said second regulating means.

3. Apparatus for regulating the composition of a fluid mixture flowing in a mixed fluid conduit connected to and fed by a pair of branch conduits carrying fluid components having substantially different densities comprising, in combination with said mixed fluid conduit, a first branch conduit connected to said mixed fluid conduit and having a pneumatically operated regulating valve therein, a second branch conduit connected to said mixed flow conduit and having a pneumatically operated regulating valve therein, an orifice-type restriction in said mixed fluid conduit, a constant volume pump connected to said mixed fluid conduit downstream of said orifice for causing a constant volume of fluid to flow through said mixed fluid conduit, first control means responsive to the pressure in said mixed fluid conduit between said orifice and said pump and operatively connected to said first regulating valve, and second control means responsive to the pressure difference across said orifice and operatively connected to said second regulating valve.

4. Apparatus for regulating the composition of a fluid mixture flowing in a mixed fluid conduit connected to and fed by a pair of branch conduits carrying fluid components having substantially different densities comprising, in combination with said mixed fluid conduit, a first branch conduit connected to said mixed fluid conduit and having a pneumatically operated regulating valve therein, a second branch conduit connected to said mixed flow conduit and having a pneumatically operated regulating valve therein for regulating fluid flow through said second branch conduit, an orifice-type restriction in said mixed fluid conduit, a constant volume pump connected to said mixed fluid conduit downstream of said orifice, a first surge chamber in said mixed gas conduit between said restriction and said constant volume pump, a second surge chamber in said mixed gas conduit upstream of said restriction, first control means responsive to the pressure in said first surge chamber and operatively connected to said first regulating valve, and second control means responsive to the pressure difference across said restriction and operatively connected to said second regulating valve, said first control means including means for maintaining the pressure downstream of said restriction at a value that is a fixed amount above a predetermined standard value.

5. Apparatus for regulating the composition of a gaseous mixture flowing in a mixed gas conduit connected to and fed by a pair of branch conduits carrying gaseous components having substantially different densities, comprising, in combination with said mixed gas conduit, a first branch conduit connected to said mixed gas conduit and having a pneumatically operated regulating valve therein, a second branch conduit connected to said mixed gas conduit and having a pneumatically operated regulating valve therein, an orifice-type restriction in said mixed gas conduit, a constant volume pump connected to said mixed gas conduit downstream of said orifice, a first surge chamber in said mixed gas conduit between said orifice and said constant volume pump, a second surge chamber in said mixed gas conduit upstream of said orifice, first control means responsive to the pressure in said first surge chamber and operatively connected to said first regulating valve, and second control means responsive to the pressure difference across said orifice and operatively connected to said second regulating valve, said first control means including means for maintaining the pressure downstream of said orifice at a value that is a fixed amount above a predetermined standard value.

References Cited in the file of this patent
UNITED STATES PATENTS 2,400,415    Hersey _____ May 14, 1946